United States Patent
Baehmann et al.

(10) Patent No.: US 9,399,919 B2
(45) Date of Patent: Jul. 26, 2016

(54) EXTENSION TIP SLEEVE FOR WIND TURBINE BLADE

(71) Applicant: General Electric Company, Schenectady, NY (US)

(72) Inventors: Peggy Lynn Baehmann, Glenville, NY (US); Jaikumar Loganathan, Bangalore (IN); Anindya Sengupta, Bangalore (IN); Vasanth Kumar Balaramudu, Bangalore (IN); Steven Robert Hayashi, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 767 days.

(21) Appl. No.: 13/731,490

(22) Filed: Dec. 31, 2012

(65) Prior Publication Data

US 2014/0186175 A1    Jul. 3, 2014

(51) Int. Cl.
*F01D 5/14* (2006.01)
*F03D 1/06* (2006.01)

(52) U.S. Cl.
CPC .............. *F01D 5/147* (2013.01); *F03D 1/0675* (2013.01); *Y02E 10/721* (2013.01)

(58) Field of Classification Search
CPC ....... F03D 1/0633; F03D 1/0675; F03D 1/06; F03D 1/065; F03D 1/0641; F03D 1/0683
See application file for complete search history.

(56) References Cited

U.S. PATENT DOCUMENTS

| | | | |
|---|---|---|---|
| 7,334,989 B2 * | 2/2008 | Arelt | F03D 1/0675 416/2 |
| 7,931,444 B2 * | 4/2011 | Godsk | F03D 1/06 416/228 |
| 7,988,421 B2 * | 8/2011 | Bakhuis | F03D 1/0633 416/224 |
| 8,029,241 B2 | 10/2011 | McGrath et al. | |
| 8,328,516 B2 * | 12/2012 | Santiago | F03D 1/0675 244/199.1 |
| 2007/0262205 A1 | 11/2007 | Grant | |
| 2011/0076149 A1 | 3/2011 | Santiago et al. | |
| 2011/0081247 A1 | 4/2011 | Hibbard | |
| 2011/0091326 A1 | 4/2011 | Hancock | |
| 2011/0142635 A1 | 6/2011 | Fritz | |

(Continued)

FOREIGN PATENT DOCUMENTS

EP     1456081 B1     5/2009

OTHER PUBLICATIONS

Migliore et al., "Feasibility Study of Pultruded Blades for Wind Turbine Rotors", National Renewable Energy Laboratory, NREL/CP-500-27506, Feb. 2000, 12 Pages.

(Continued)

*Primary Examiner* — Nathaniel Wiehe
*Assistant Examiner* — Cameron Corday
(74) *Attorney, Agent, or Firm* — Ann M. Agosti

(57) ABSTRACT

A wind blade is provided. The wind blade includes a body having an aerodynamic contour extended between a blade root and a blade tip. The wind blade also includes an extension tip sleeve arranged over the blade tip. The extension tip sleeve further includes a first portion having an extension blade and one or more structural ribs arranged on a pressure side of the wind blade. The extension tip sleeve also includes a second portion having a support structure located on a suction side of the wind blade. Furthermore, the wind blade includes a fairing having an airfoil shape for covering the one or more structural ribs, and the support structure of the extension tip sleeve.

13 Claims, 5 Drawing Sheets

(56) References Cited

U.S. PATENT DOCUMENTS

| | | |
|---|---|---|
| 2011/0223028 A1 | 9/2011 | Stege et al. |
| 2011/0243736 A1 | 10/2011 | Bell |
| 2012/0121430 A1* | 5/2012 | Olsen .................... F03D 1/0675 416/241 R |
| 2012/0132011 A1 | 5/2012 | Frere et al. |
| 2012/0134817 A1 | 5/2012 | Bagepalli et al. |
| 2012/0141269 A1 | 6/2012 | Giguere et al. |

OTHER PUBLICATIONS

Brice Banel, "Progress Report—What has been done", Choice of the wing section:NREL S809, Jan. 2011, 5 Pages.

* cited by examiner

_EXTENSION TIP SLEEVE FOR WIND TURBINE BLADE_

BACKGROUND

The present application relates generally to wind turbines and more particularly relates to wind turbine rotor blades with extension tip sleeves.

Most environment friendly energy sources presently available come from wind power that is considered to be one of the cleanest. In this regard, wind turbines have gained increased attention. Wind turbines generate electricity by effectively harnessing energy in the wind via a rotor having a set of rotor blades that turns a gearbox and generator, thereby converting mechanical energy to electrical energy that may be deployed to a utility grid.

To ensure that wind power remains a viable energy source, efforts have been made to increase energy output by modifying the size, configuration and capacity of wind turbines. One such modification has been to extend the tip of each wind turbine rotor blade. Such a tip extension can be employed to improve the overall efficiency and performance of a wind turbine. The tip extension results in larger rotor area and hence leads to increase in Annual Energy Production (AEP). The tip area of existing blades typically does not include any internal structure to support additional loads due to an extended blade. Moreover, the tip extension includes cutting off the existing blade tip first, which is done in order to attach a new tip extension. This modification is cumbersome and cannot be done uptower.

There is therefore a desire for a wind blade and method for improved aerodynamic and structural performance of the wind blade. Such wind blades should improve overall system efficiency while being inexpensive to fabricate and providing a long lifetime.

BRIEF DESCRIPTION

In accordance with an embodiment of the invention, a wind blade is provided. The wind blade includes a body having an aerodynamic contour extended between a blade root and a blade tip. The wind blade also includes an extension tip sleeve arranged over the blade tip. The extension tip sleeve further includes a first portion having a blade extension and one or more structural ribs or a thick skin arranged on a pressure side of the wind blade. The extension tip sleeve also includes a second portion having a support structure located on a suction side of the wind blade. Furthermore, the wind blade includes a fairing having an airfoil shape for covering the one or more structural ribs, and the support structure of the extension tip sleeve.

In accordance with an embodiment of the invention, a method of providing a structural support for a wind blade extension is provided. The method includes assembling a first portion of an extension tip sleeve over a blade tip of the wind blade, wherein the first portion comprises a blade extension and one or more structural ribs arranged on a pressure side of the wind blade. The method also includes disposing a second portion of the extension tip sleeve on a suction side of the wind blade, wherein the second portion comprises a support structure. Further, the method includes arranging a fairing having an airfoil shape for covering the one or more structural ribs, and the support structure of the extension tip sleeve.

In accordance with an embodiment of the invention, a wind turbine is provided. The wind turbine includes multiple wind blades, wherein each of the blades comprises a body having an aerodynamic contour extended between a blade root and a blade tip. Each of the blades also includes an extension tip sleeve arranged over the blade tip. The extension tip sleeve includes a first portion having a blade extension and one or more structural ribs arranged on a pressure side of the wind blade. The extension tip sleeve also includes a second portion comprising a support structure located on a suction side of the wind blade. The wind blade further includes a fairing having an airfoil shape for covering the one or more structural ribs, and the support structure of the extension tip sleeve.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
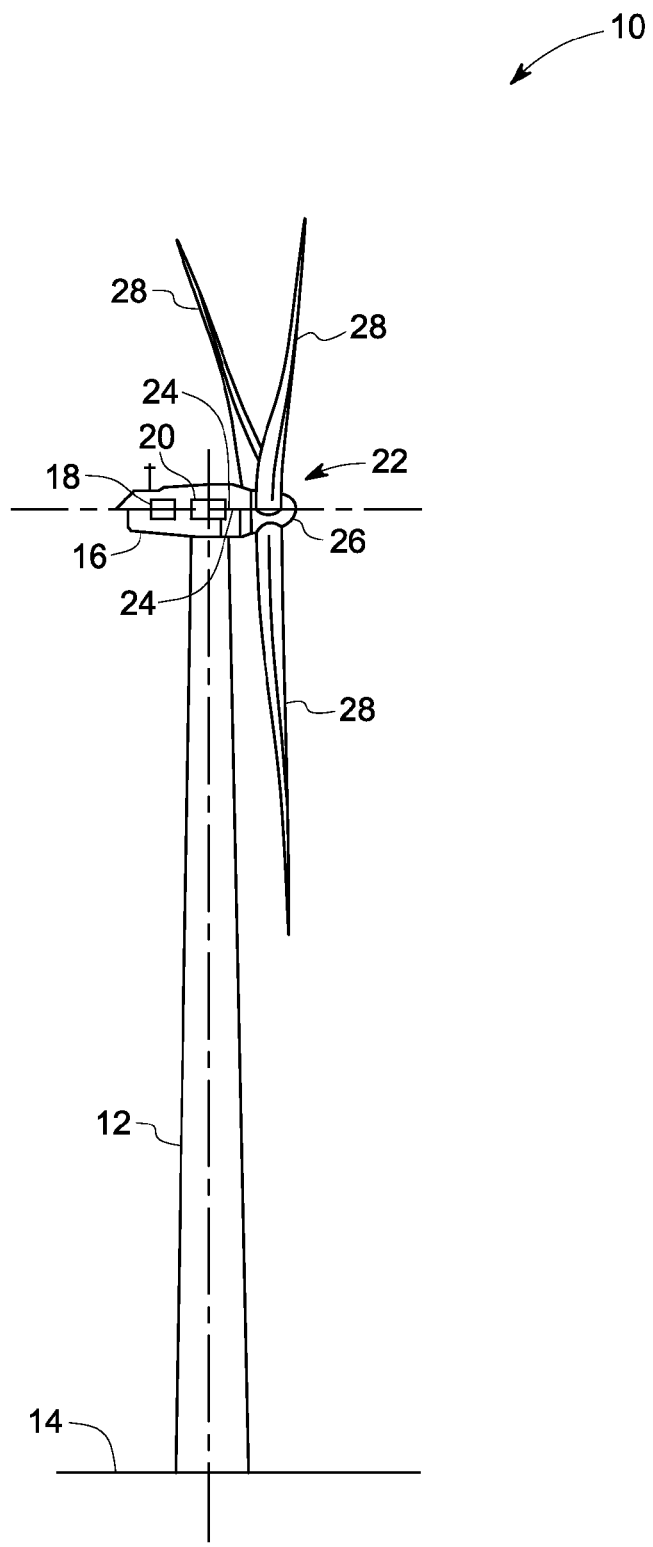
FIG. 1 is a side view of a wind turbine in accordance with an embodiment of the present invention.

FIG. 1 is a perspective view of an exemplary wind turbine 10 in accordance with an embodiment of the present invention. In this embodiment, the wind turbine 10 is a horizontal-axis wind turbine. Alternatively, the wind turbine 10 may be a vertical-axis wind turbine. In the present embodiment, the wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotatably coupled to the gearbox 20 with a rotor shaft 24. The rotor 22 includes a rotatable hub 26 and at least one rotor blade 28 coupled to and extending outward from the rotatable hub 26.

Figure 2:
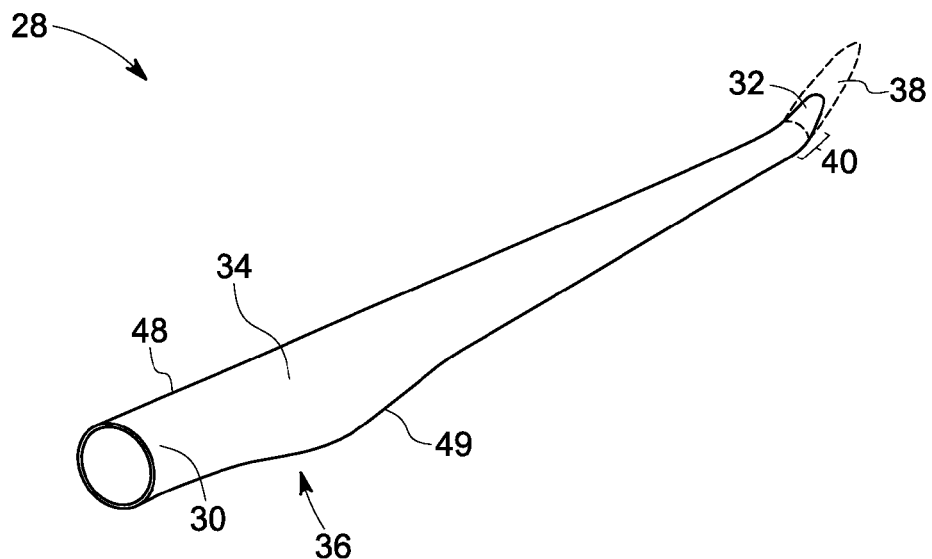
FIG. 2 is a perspective view of a wind blade with an extension tip sleeve arranged over a bent portion of a blade tip in accordance with an embodiment of the present invention.
Figure 3:
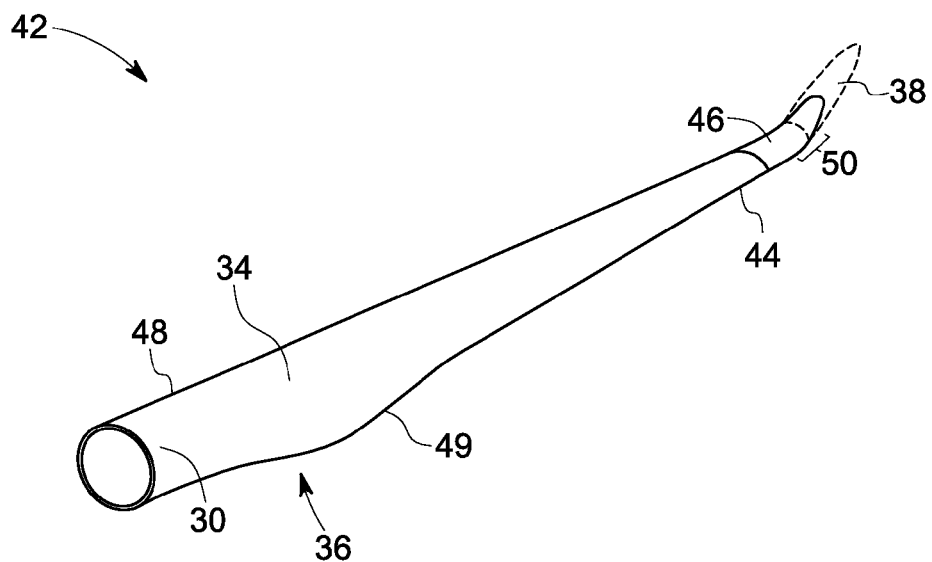
FIG. 3 is a perspective view of the wind blade with an extension tip sleeve arranged over a bent portion of a winglet fitted with a straight blade tip end of the wind blade in accordance with an embodiment of the present invention.

FIG. 2 is a perspective view of a wind blade 28 in accordance with an embodiment of the present invention. As shown, the wind blade 28 includes a body having an aerodynamic contour extended between a blade root 30 and a blade tip 32. The wind blade 28 includes a pressure side 34 and a suction side 36 extending between a leading edge 48 (as shown in FIG. 3) and a trailing edge 49 (as shown in FIG. 3). The wind blade 28 also includes an extension tip sleeve 38 arranged over the blade tip 32. This extension tip sleeve 38 is configured to slip-fit over a bent portion 40 of the blade tip 32 of the wind blade 28.

In another embodiment, a perspective view of a wind blade 42 having a winglet 46 is shown in FIG. 3 in accordance with an embodiment of the present invention. The winglet 46 includes an aerodynamic profiled contour with a bent portion 50 and is typically arranged over a straight blade tip 44 of the wind blade 42 for improving the overall efficiency and performance of the wind blade. In this embodiment, the use of the extension tip sleeve 38 over a tip of the winglet 46 results in further improvement in AEP. The extension tip sleeve 38 is configured to slip-fit over the tip and the bent portion 50 of the winglet 46. The details of the extension tip sleeve 38 are discussed in following from FIG. 4 to FIG. 7 below. In one embodiment, the winglet 46 includes the extension tip sleeve 38.

Figure 4:
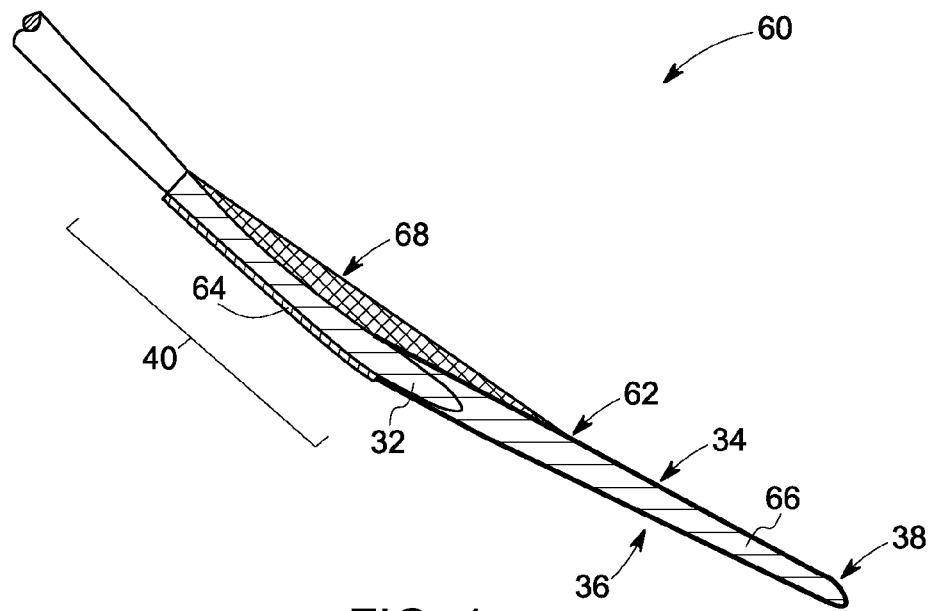
FIG. 4 is a side view of an assembly of a wind blade tip and an extension tip sleeve in accordance with an embodiment of the present invention.

As shown, FIG. 4 is a side view of an assembly 60 of the blade tip 32 (as shown in FIG. 2) and the extension tip sleeve 38 in accordance with an embodiment of the present invention. The extension tip sleeve 38 is adapted to slip-fit over the bent portion 40 of the blade tip 32 of the wind blade 28. As shown, the extension tip sleeve 38 includes a first portion 62 and a second portion 64. While mounting the extension tip sleeve 38 over the blade tip 32, the first portion 62 is slip-fitted easily in the bent portion 40 due to the shape and then the second portion 64 is arranged on the suction side 36 of the wind blade 60 such that the extension tip sleeve 38 is firmly held over the blade tip 32. The first portion 62 includes a blade extension 66 and further includes one or more structural ribs 68 arranged on a pressure side 34 of the wind blade 28 at the bent portion 40. In one embodiment, the blade extension 66 includes a structural frame covered by a fabric in a tensioned state. In another embodiment, the fabric includes an ultraviolet cured fabric located over the structural frame of the extension tip sleeve 38. In yet another embodiment, the blade extension includes standard blade construction. The second portion 64 includes a support structure that is also located at the bent portion 40 of the blade tip 32 on the suction side 36 of the wind blade.

Furthermore, the one or more structural ribs 68 of the first portion 62 and the support structure of the second portion 64 of the extension tip sleeve 38 are arranged over the winglet 46 (as shown in FIG. 3) in a similar manner as discussed above with respect to the assembly 60 (as shown in FIG. 4) of the extension tip sleeve 38 and the blade tip 32. The one or more structural ribs 68 are arranged at the bent portion 50 of the winglet 46 (as shown in FIG. 3) on the pressure side 34 of the wind blade 42, whereas the structural support is arranged at the bent portion 50 of the winglet 46 (as shown in FIG. 3) on the suction side 36 of the wind blade 42. It is to be noted that the extension tip sleeve 38 is a replaceable or a disposable sleeve that is easily mountable over the blade tip or over tip of the winglet during maintenance of the wind turbine. Moreover, the extension tip sleeve 38 may also be permanently fitted with the blade tip 32 or the winglet 46 of the wind blade 28, 42.

Figure 5:
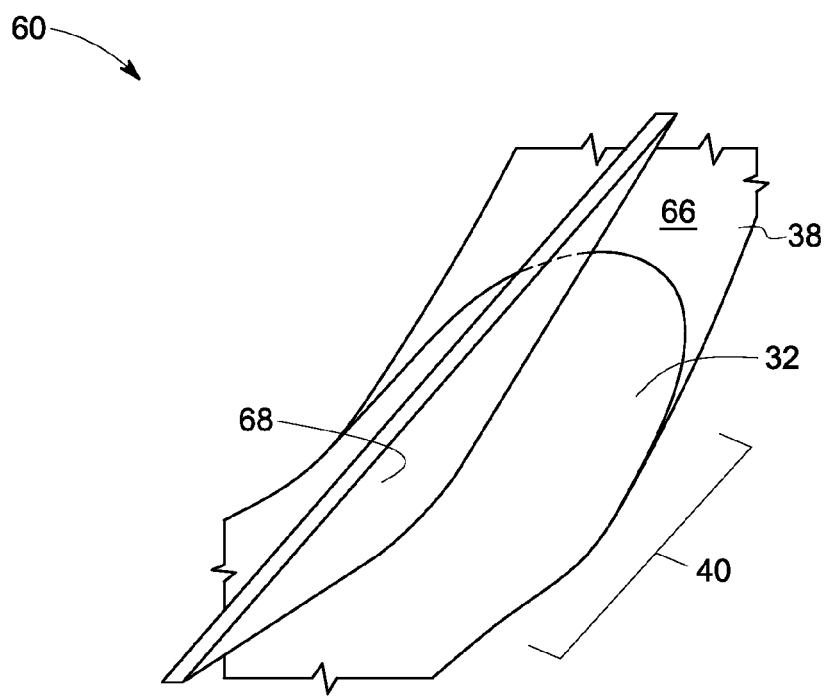
FIG. 5 shows an assembly of an extension tip sleeve over a blade tip of a wind blade at a pressure side in accordance with an embodiment of the present invention.

FIG. 5 shows a perspective view of the assembly 60 of the extension tip sleeve 38 over the blade tip 32 or tip of winglet 46 of a wind blade (28, 42) at a pressure side 34 in accordance with an embodiment of the present invention. As shown, the one or more structural ribs 68 connect the blade extension 66 with a structural portion of the wind blade adjacent to the blade tip 32. The one or more structural ribs 68 include a profile shape that matches with the bent portion 40 of the blade tip 32. Typically, the blade tip 32 does not include any structural support and therefore, the presence of the one or more structural ribs 68 provides an external support for handling additional loads due to the extension tip sleeve 38 in the wind blade 28. Non-limiting examples of a material of the one or more structural ribs 68 include lightweight composite, glass or carbon, foam or balsa, or a lightweight metal. Further, the cross-section of the one or more structural ribs may include an I-beam shape or a rectangular shape.

Figure 6:
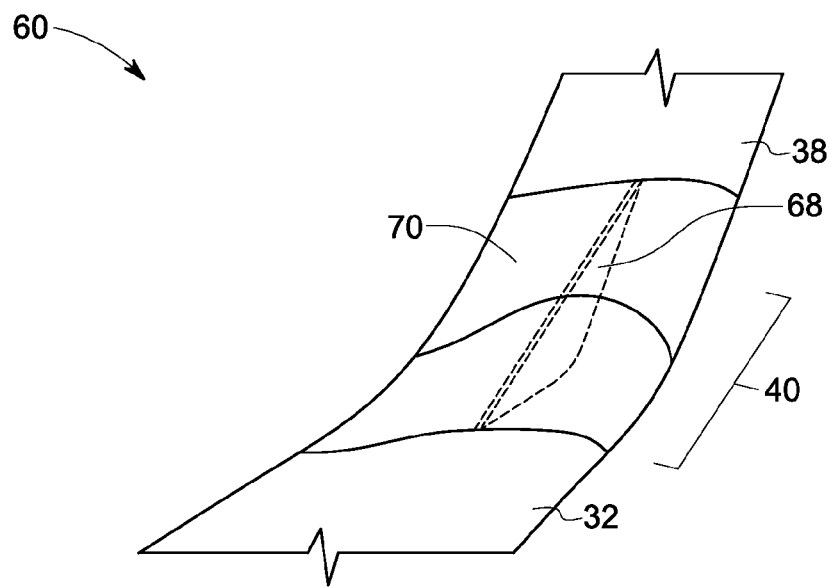
FIG. 6 is a partial view of an assembly of an extension tip sleeve and a wind blade tip with a fairing covering the bent portion of the wind blade in accordance with an embodiment of the present invention.
Figure 7:
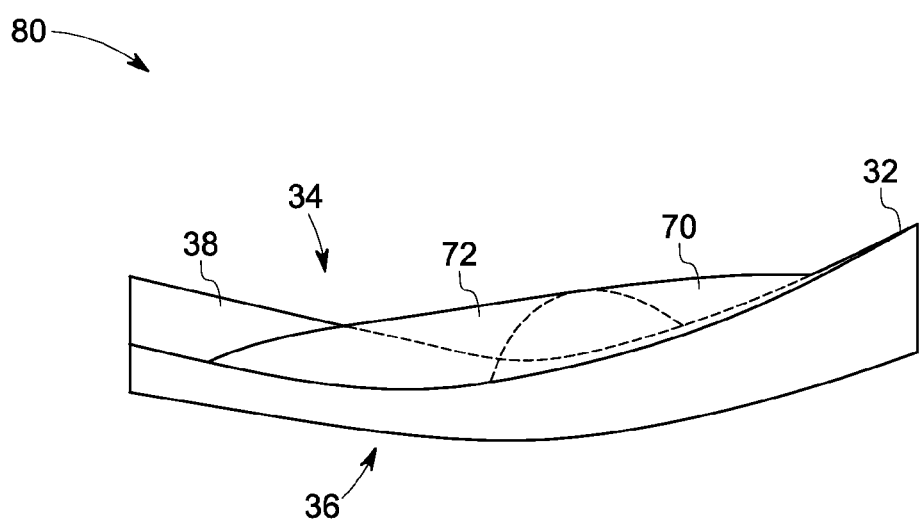
FIG. 7 is another partial view of an assembly of an extension tip sleeve and a wind blade tip with a fairing covering the bent portion of the wind blade in accordance with an embodiment of the present invention.

FIG. 6 is a partial view of an assembly 60 of an extension tip sleeve 38 and the wind blade tip 32 or tip of winglet 46 of the wind blade (28, 42) in accordance with an embodiment of the present invention. The assembly 60 includes a fairing 70 covering the bent portion 40 or 50 of the blade tip 32 or winglet tip of the wind blade 28, or 42. The fairing 70 includes a airfoil shape for covering the one or more structural ribs 68 or a thick skin layer 72 (as shown in FIG. 7), and the support structure of the extension tip sleeve 38 at the bent portion 40 or 50 of the blade tip 32 or tip of the winglet 46 where the extension tip sleeve 38 is attached. In one embodiment, the fairing includes a first section located on the pressure side 34 and a second section located on the suction side 36 of the wind blade 28, 42. For example, each of the first and second sections of the fairing 70 may have an aerodynamic profile that corresponds to the aerodynamic profile of adjacent blade tip 32 or the winglet 46 (as shown in FIG. 3) and the extension tip sleeve 38. Thus, the aerodynamic profiles of the fairing 70 and the extension tip sleeve 38 may form a continuous aerodynamic profile of the wind blade 28, 42. Further, in a non-limiting manner, the fairing 70 includes a lightweight composite material or a lightweight metal construction from materials such as aluminum or steel.

FIG. 7 is another partial view of an assembly 80 of the extension tip sleeve 38 and a wind blade tip 32 or tip or winglet 46 with a fairing 70 covering the bent portion 40 or 50 of the wind blade 28, 42 in accordance with an embodiment of the present invention. In this embodiment, the extension tip sleeve 38 includes the thick skin layer 72 instead of the one or more structural ribs 68 on the pressure side 34 of the wind blade 28, 42 underneath the fairing 70. Both the thick skin layer 72 and the fairing 70 includes an aerodynamic profile that corresponds to the aerodynamic profile of adjacent blade tip 32 or the winglet 46 (as shown in FIG. 3) and the extension tip sleeve 38. In another embodiment, the fairing 70 may comprise a portion of the thick skin layer 72 of the extension tip sleeve 38. Further, non-limiting examples of a material of the thick skin layer 72 include lightweight composite, glass or carbon.

In one embodiment, the extension tip sleeve 38 and the fairing 70 are attached to the blade tip 32 or the tip of winglet 46 of the wind blade 28, 42 by an adhesive. In another embodiment, the extension tip sleeve 38 and the fairing 70 are attached to the blade tip 32 or the tip of the winglet 46 of the wind blade 28, 42 with a hook and loop mechanism. In yet another embodiment, non-limiting examples of attachment mechanisms for attaching different sections of the assembly 60 may include mechanical fasteners such as bolts, pins, rivets. In one embodiment, the extension tip sleeve 38 is slipped over an existing blade tip and an ultraviolet cure wet laminate is applied at attachment region. In another embodiment, the extension tip sleeve 38 is slipped over an existing blade tip and banded or clamped together at the attachment point.

Furthermore, it is to be noted that the extension tip sleeve as discussed above is adapted to be slipped only from the blade tip side. On the other hand, if the extension tip sleeve 38 is made in one piece, then the extension tip sleeve 38 can be slipped on from the trailing edge side or the leading edge side over the blade tip.

Figure 8:
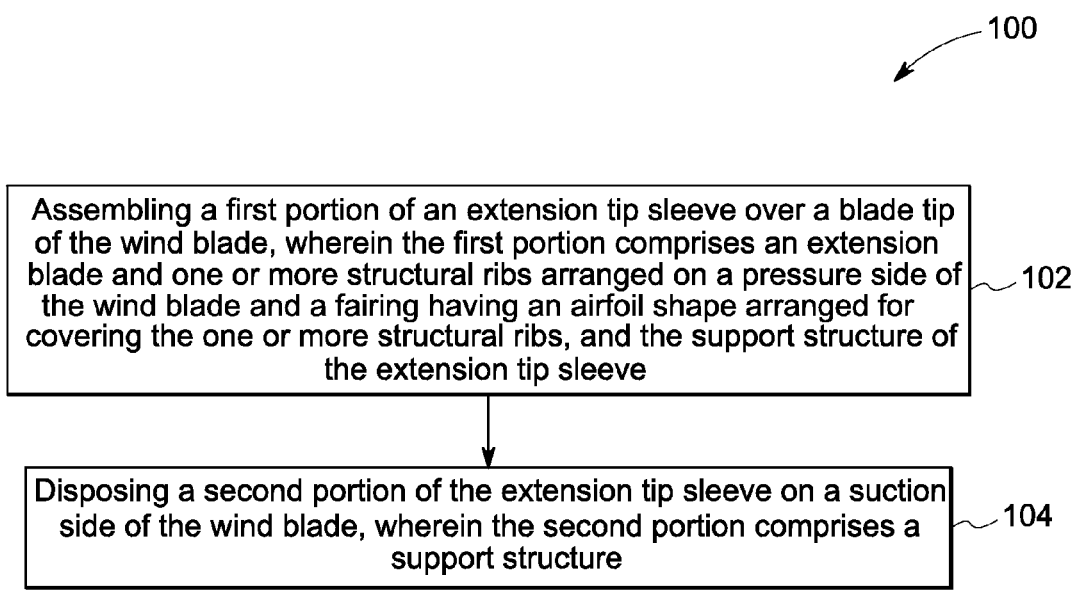
FIG. 8 is flow chart of a method of providing a structural support for a wind blade in accordance with an embodiment of the present invention.

FIG. 8 is flow chart 100 of a method of providing a structural support for a wind blade in accordance with an embodiment of the present invention. At step 102, the method includes assembling a first portion of an extension tip sleeve over a blade tip of the wind blade, wherein the first portion comprises an extension blade and one or more structural ribs arranged on a pressure side of the wind blade and a fairing having an airfoil shape arranged for covering the one or more structural ribs, and the support structure of the extension tip sleeve. In one embodiment, the assembling the first portion of the extension tip sleeve over the blade tip comprises slip-fitting the first portion over a bent portion of the blade tip of the wind blade or over a bent portion of a winglet mounted on a straight blade tip of the wind blade. Further, at step 104, the method includes disposing a second portion of the extension tip sleeve on a suction side of the wind blade, wherein the second portion comprises a support structure.

In one embodiment, a wind turbine is provided. The wind turbine includes a plurality of wind blades. Each of the wind blades includes a body having an aerodynamic contour extended between a blade root and a blade tip. The wind blade also includes an extension tip sleeve arranged over the blade tip. Further, the extension tip sleeve includes a first portion having a blade extension and one or more structural ribs arranged on a pressure side of the wind blade. The extension tip sleeve includes a second portion having a support structure located on a suction side of the wind blade. Furthermore, the wind blade includes a fairing having an airfoil shape for covering the one or more structural ribs, and the support structure of the extension tip sleeve.

Advantageously, the present invention facilitates in providing a structural support for a wind blade tip by slip-fitting the extension tip sleeve over the blade tip or tip of the winglet that result in longer wind blade and higher aerodynamic performance. Further, the slip-fitting of the extension tip sleeve involves an easy procedure that can be carried out up tower thereby, reducing downtime and increases overall AEP of the wind blade. Moreover, the present invention extends the wind blade without cutting off the existing blade tip as compared to what is typically done in order to attach a new tip extension. Further, the present invention is economical.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind blade comprising:
    a body having an aerodynamic contour extended between a blade root and a blade;
    an extension tip sleeve arranged over the blade tip, said extension tip sleeve configured to slip-fit over a bent portion of the blade tip of the wind blade and comprising:
        a first portion comprising a blade extension and one or more structural ribs arranged at the bent portion on a pressure side of the wind blade; and
        a second portion comprising a support structure located on a suction side of the wind blade; and
    a fairing having an airfoil shape for covering the one or more structural ribs and the support structure of the extension tip sleeve.

2. The wind blade of claim 1, wherein the support structure is arranged at the bent portion of the blade tip on the suction side of the wind blade.

3. The wind blade of claim 1, wherein the fairing having the airfoil shape comprises a first section located on the pressure side and a second section located on the suction side of the wind blade.

4. The wind blade of claim 1, wherein a material of the one or more structural ribs is chosen from a group of composite, glass or carbon or metal.

5. The wind blade of claim 1, wherein the blade extension of the extension tip sleeve comprises an ultraviolet cured fabric located over a structural frame.

6. The wind blade of claim 1, wherein the blade extension of the extension tip sleeve comprises a fabric in a tensioned state over a structural frame.

7. The wind blade of claim 1, wherein the extension sleeve and the fairing are bonded to the blade tip of the wind blade by an adhesive.

8. The wind blade of claim 1, wherein the extension tip sleeve and the fairing are attached to the blade tip of the wind blade with a hook and loop mechanism or with mechanical fasteners or a clamp or a band.

9. A method of providing a structural support for a wind blade extension, the method comprising:
    assembling a first portion of an extension tip sleeve over a blade tip of the wind blade, wherein the first portion comprises an extension blade and one or more structural ribs arranged on a pressure side of the wind blade and a fairing having an airfoil shape arranged for covering the one or more structural ribs, and the support structure of the extension tip sleeve; and
    disposing a second portion of the extension tip sleeve on a suction side of the wind blade, wherein the second portion comprises a support structure.

10. The method of claim 9, wherein the assembling the first portion of the extension tip sleeve over the blade tip comprises slip-fitting the first portion over a bent portion of the blade tip of the wind blade or over a bent portion of a winglet mounted on a straight blade tip of the wind blade.

11. A wind turbine comprising:
    a plurality of wind blades, wherein each of the blade comprises:
        a body having an aerodynamic contour extended between a blade root and a blade tip;

an extension tip sleeve arranged over the blade tip, said extension tip sleeve comprising:
  a first portion comprising an extension blade and one or more structural ribs arranged on a pressure side of the wind blade; and
  a second portion comprising a support structure located on a suction side of the wind blade; and
a fairing having an airfoil shape for covering the one or more structural ribs, and the support structure of the extension tip sleeve.

12. A wind blade comprising:
a body having an aerodynamic contour extended between a blade root and a blade tip;
a winglet having an aerodynamic profiled contour arranged over the blade tip of the wind blade, wherein the winglet comprises a bent portion;
one or more structural ribs arranged at the bent portion of the winglet on a pressure side of the wind blade; and
a support structure located arranged at the bent portion of the winglet on a suction side of the wind blade; and
a fairing having an airfoil shape for covering the one or more structural ribs and the support structure.

13. A wind blade comprising:
a body having an aerodynamic contour extended between a blade root and a blade tip;
an extension tip sleeve arranged over the blade tip, said extension tip sleeve comprising:
  a first portion comprising a blade extension and one or more structural ribs or a skin layer arranged on a pressure side of the wind blade; and
  a second portion comprising a support structure located on a suction side of the wind blade; and
a fairing having an airfoil shape for covering the one or more structural ribs or the skin layer, and the support structure of the extension tip sleeve, wherein the fairing is a composite material configured to be slideable from a trailing edge side or a leading edge side of the wind blade.

* * * * *